US010662859B1

(12) United States Patent
Harris et al.

(10) Patent No.: US 10,662,859 B1
(45) Date of Patent: May 26, 2020

(54) DUAL FLAP ACTIVE INLET COOLING SHROUD

(71) Applicant: Northwest ULD, Inc., McMinnville, OR (US)

(72) Inventors: Chris B. Harris, Amity, OR (US); Gregory J. Stadeli, Silverton, OR (US)

(73) Assignee: NORTHWEST ULD, INC., McMinnville, OR (US)

( * ) Notice: Subject to any disclaimer, the term of this patent is extended or adjusted under 35 U.S.C. 154(b) by 378 days.

(21) Appl. No.: 15/585,004

(22) Filed: May 2, 2017

Related U.S. Application Data

(60) Provisional application No. 62/330,681, filed on May 2, 2016.

(51) Int. Cl.
F01P 7/14 (2006.01)
H02K 7/14 (2006.01)
F01P 1/02 (2006.01)
F01P 3/02 (2006.01)
F01P 7/02 (2006.01)
B63H 21/38 (2006.01)
B64D 33/08 (2006.01)
B63H 21/14 (2006.01)

(52) U.S. Cl.
CPC .............. F01P 7/14 (2013.01); B63H 21/14 (2013.01); B63H 21/383 (2013.01); B64D 33/08 (2013.01); F01P 1/02 (2013.01); F01P 3/02 (2013.01); F01P 7/02 (2013.01); H02K 7/14 (2013.01); B63B 2758/00 (2013.01); F01P 2001/023 (2013.01); F01P 2001/026 (2013.01); F01P 2003/021 (2013.01); F01P 2003/024 (2013.01); F01P 2007/146 (2013.01)

(58) Field of Classification Search
CPC ........ F01P 7/14; F01P 1/02; F01P 3/02; F01P 7/02; F01P 2001/023; F01P 2001/026; F01P 2003/021; F01P 2003/024; F01P 2007/1461; B63H 21/14; B63H 21/383; B64D 33/08; H02K 7/14; B63B 2758/00
USPC ........................................................ 123/41
See application file for complete search history.

(56) References Cited

U.S. PATENT DOCUMENTS

| 1,614,075 A | * | 1/1927 | McCaleb | F01P 7/10 123/41.06 |
| 2,413,770 A | * | 1/1947 | Knoy | F01P 3/22 237/12.3 B |
| 3,777,808 A | * | 12/1973 | Izumi | B60K 11/02 165/271 |
| 3,788,264 A | * | 1/1974 | Gibson | B60K 11/06 123/41.7 |

(Continued)

Primary Examiner — Hung Q Nguyen
Assistant Examiner — Anthony Donald Taylor, Jr.
(74) Attorney, Agent, or Firm — Snell & Wilmer L.L.P.

(57) ABSTRACT

A cooling shroud assembly for an engine is disclosed. This cooling shroud assembly includes a shroud body. There is an inlet door or flap to an interior of this shroud body, along with an outlet door or flap from this shroud body. When installed on an engine that is incorporated by a moving vehicle (e.g., aircraft, unmanned aerial vehicle, radio-controlled aircraft, watercraft), airflow through the shroud body from an inlet to an outlet. The position of the inlet and outlet doors may be adjusted (e.g., simultaneously) to change the airflow through the shroud body, and to thereby change the dissipation of heat from the operating engine via this airflow.

25 Claims, 15 Drawing Sheets

(56) References Cited

U.S. PATENT DOCUMENTS

| | | | | |
|---|---|---|---|---|
| 4,000,854 A * | 1/1977 | Konarski | ............... | F02K 1/006 239/265.35 |
| 4,397,431 A * | 8/1983 | Ben-Porat | ............. | B64D 33/02 244/53 B |
| 4,961,405 A * | 10/1990 | Dorsch | ................... | F01P 1/02 123/41.61 |
| 5,036,803 A * | 8/1991 | Nolting | .................... | F01P 5/10 123/41.05 |
| 7,918,195 B2 * | 4/2011 | McCall, III | .............. | F01P 1/02 123/195 C |
| 8,561,738 B2 * | 10/2013 | Charnesky | .......... | B60K 11/085 180/68.1 |
| 8,607,744 B2 * | 12/2013 | Alexander | ............ | F02B 27/001 123/41.05 |
| 8,887,846 B2 * | 11/2014 | Yoo | ..................... | B60K 11/085 180/68.1 |
| 9,902,255 B2 * | 2/2018 | Kim | ....................... | B60K 11/02 |
| 10,059,192 B2 * | 8/2018 | Jackson | ................... | F01P 7/10 |
| 2010/0230530 A1 * | 9/2010 | Nannoni | ................ | B64D 7/08 244/17.11 |
| 2011/0073395 A1 * | 3/2011 | Lee | ..................... | B60K 11/085 180/68.1 |
| 2011/0265650 A1 * | 11/2011 | Kazlauskas | ............ | B64D 33/02 95/269 |
| 2013/0087663 A1 * | 4/2013 | Dailey | .................. | B64D 33/02 244/53 B |
| 2014/0086722 A1 * | 3/2014 | Liedel | ..................... | B60K 11/04 415/1 |
| 2014/0220873 A1 * | 8/2014 | Bleechmore | .......... | B64D 33/08 454/141 |
| 2014/0246863 A1 * | 9/2014 | Vallinayagam | .......... | H02K 9/02 290/1 B |
| 2016/0214460 A1 * | 7/2016 | Errick | ................... | B60K 11/04 |
| 2016/0245161 A1 * | 8/2016 | Thomassin | ............... | F01C 1/22 |

* cited by examiner

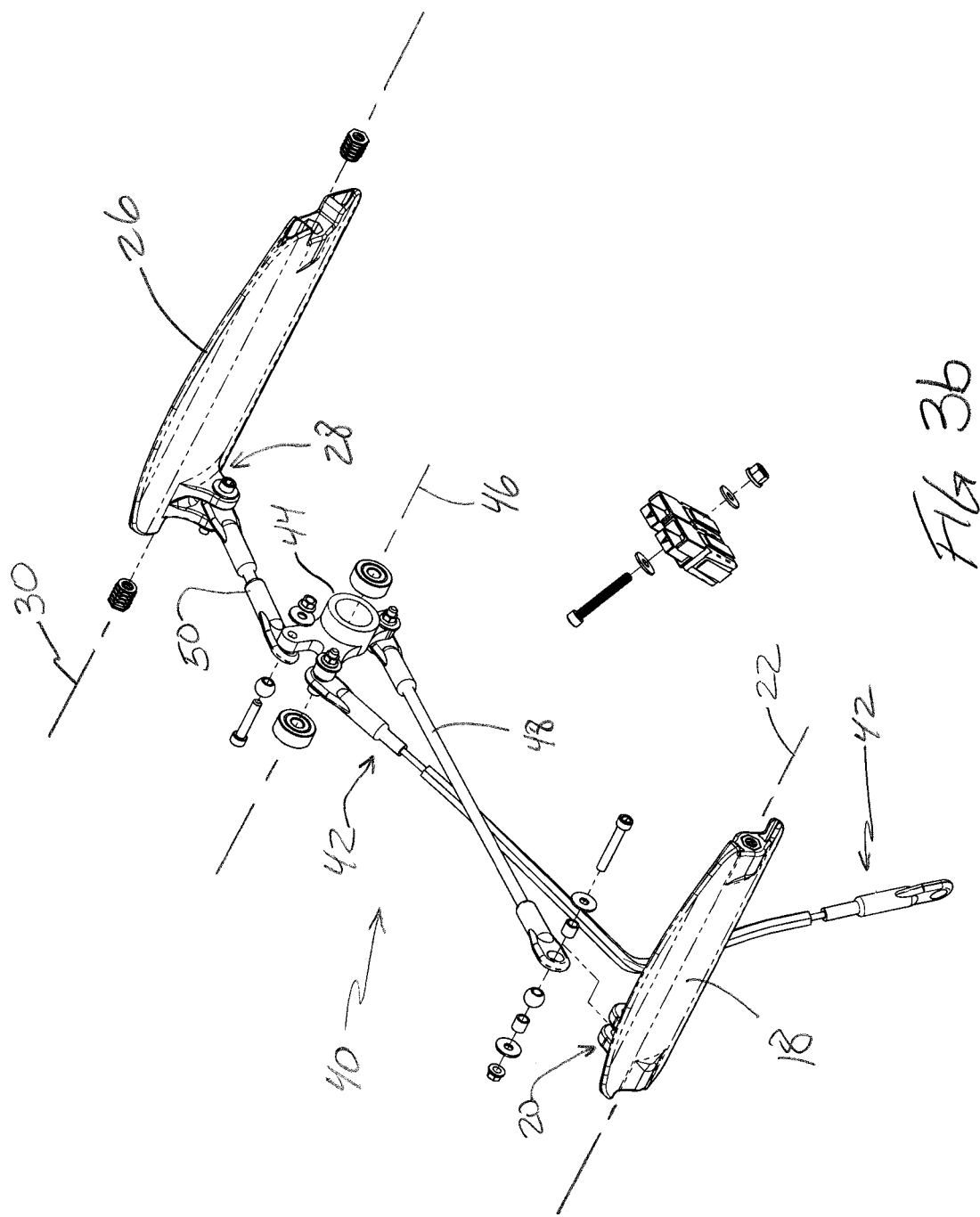

DUAL FLAP ACTIVE INLET COOLING SHROUD

CROSS-REFERENCE TO RELATED APPLICATIONS

This patent application claims the benefit of U.S. Provisional Patent Application No. 62/330,681, that was filed on May 2, 2016, and the entire disclosure of which is hereby incorporated by reference herein.

FIELD OF THE INVENTION

The present invention generally relates to the temperature control of small engines and more specifically small engines as used in the propulsion of aircraft, unmanned aerial vehicles, radio-controlled model aircraft, watercraft, and the like.

SUMMARY

The present invention is embodied by a synchronous actuation of two inlet flaps within a cooling shroud to allow for precision control of cylinder and cylinder head temperature when utilized on heavy fuel engines, particularly at cold temperatures.

A first aspect of the present invention is embodied by an engine that includes a heat source, a heat exchanger, a cooling medium flowpath, first and second flow controllers, and a drive source. The heat exchanger is positioned to remove heat from the heat source as desired/required by a flow of a cooling medium along the cooling medium flowpath. The first and second flow controllers are spaced along this cooling medium flowpath, with at least part of the heat exchanger being located in the spacing between these first and second flow controllers. The drive source is operatively interconnected with both the first flow controller in the second flow controller.

A number of feature refinements and additional features are separately applicable to the first aspect of the present invention. These feature refinements and additional features may be used individually or in any combination in relation to the first aspect. One embodiment as the engine being in the form of an internal combustion engine. Such an engine assembly may be mounted in any appropriate manner to a vehicle body of any appropriate type, such as an airframe of an aircraft or aerial vehicle (e.g., unmanned; radio-controlled), a bulkhead of a watercraft, or the like.

A controller may be operatively interconnected with the drive source, which may be in the form of a single motor, multiple motors, or the like. The engine may further include a temperature sensor that is associated with the heat source (e.g., for monitoring a temperature that is associated with the heat source), and that is operatively interconnected with this controller (e.g., by conveying a signal that is indicative of a sensed/monitored temperature). In any case, the noted controller may be operated to control the adjustment of both the first flow controller and the second flow controller. For instance, the controller may send an appropriate signal or combination of signals (e.g., electrical signals) to the drive source. One embodiment has the drive source being in the form of first and second motors, where the first motor is operatively interconnected with the first flow controller and the second motor is operatively interconnected with the second flow controller. Another embodiment has the drive source being in the form of a single motor, where this single motor is operatively interconnected with both the first flow controller and the second flow controller.

The first and second flow controllers may be characterized as valving of sorts for throttling the flow of cooling medium through/along the cooling medium flowpath (e.g., throttle valves). One embodiment has each of the first and second flow controllers being in the form of a flap or a door that are each disposed in but spaced at different locations along the cooling medium flowpath. The cooling medium flowpath may be defined in part by a shroud body that is appropriately interconnected with the engine (e.g., detachably). Such a shroud body may be positioned above a cylinder head for the engine. In any case, the "cooling medium" that flows through the cooling medium flowpath may be ambient air that flows through the shroud body as the engine propels an associate vehicle body (e.g., an airframe for an aircraft or aerial vehicle, including unmanned and/or radio-controlled).

The engine may be configured such that the drive source simultaneously adjusts both the first flow controller and the second flow controller at least approximately a common amount in a flow-increasing direction relative to the cooling medium flowpath. This may allow/accommodate an increase in the flow of cooling medium through/along the cooling medium flowpath. The engine may be configured such that the drive source simultaneously adjusts both the first flow controller and the second flow controller at least approximately a common amount in a flow-decreasing direction relative to the cooling medium flowpath. This may allow/accommodate a decrease in the flow of cooling medium through/along the cooling medium flowpath.

The engine assembly may be configured such that the drive source is operable to adjust the first flow controller in each of a flow-increasing direction relative to the cooling medium flowpath and a flow-decreasing direction relative to the cooling medium flowpath. The engine assembly may be configured such that the drive source is operable to adjust the second flow controller in each of a flow-increasing direction relative to the cooling medium flowpath and a flow-decreasing direction relative to the cooling medium flowpath. These adjustments of the first flow controller in the second flow controller may be made simultaneously by the drive source (e.g., a single servomotor), although the drive source (e.g., one or more motors) may be operable to adjust the first flow controller and the second flow controller other than simultaneously (e.g., sequentially). One embodiment has the drive source being operated to adjust the first flow controller and the second flow controller by at least approximately a common amount in a flow-increasing direction relative to the cooling medium flowpath (e.g., simultaneously; sequentially). One embodiment has the drive source being operated to adjust the first flow controller and the second flow controller by at least approximately a common amount in a flow-decreasing direction relative to the cooling medium flowpath (e.g., simultaneously; sequentially).

The heat source for the engine may be in the form of an engine block, a cylinder head, or a cylinder head that is mounted to the engine block. The heat exchanger may be mounted to or incorporated by the heat source. In the case where the engine is in the form of an internal combustion engine the heat exchanger may be in the form of a plurality of cooling fins (e.g., associated with a cylinder head), that are disposed within the cooling medium flowpath. The heat exchanger may also be in the form of a radiator that is disposed within the cooling medium flowpath.

A second aspect of the present invention is embodied by an engine module or an engine assembly that includes an engine and a cooling shroud assembly. The cooling shroud assembly includes a shroud body having an inlet to and an outlet from an interior flowpath that is defined at least in part by the shroud body when installed on the engine. An inlet door or flap is movably interconnected with the shroud body (e.g., pivotally), as is an outlet door or flap. The inlet door and the outlet door are disposed at different locations along the noted interior flowpath. The engine module further includes a motor. This motor is operatively interconnected with both the inlet door and the outlet door. A first operation/ operational mode of the motor will simultaneously adjust the inlet door and outlet door in a flow-increasing direction. A second operation/operational mode of this same motor will simultaneously adjust the inlet door and outlet door in a flow-decreasing direction.

A number of feature refinements and additional features are separately applicable to the second aspect of the present invention. These feature refinements and additional features may be used individually or in any combination in relation to the second aspect. One embodiment as the engine being in the form of an internal combustion engine. Such an engine assembly may be mounted in any appropriate manner to a vehicle body of any appropriate type, such as an airframe of an aircraft or aerial vehicle (e.g., unmanned; radio-controlled), a bulkhead of a watercraft, or the like.

A drive linkage may operatively interconnect the motor with a bell crank that pivots about a fixed axis. A first linkage may operatively interconnect the inlet door with the bell crank, while a second linkage may operatively interconnect the outlet door with the bell crank. The drive linkage, first linkage, and second linkage each may interconnect with a different location that is spaced from the fixed pivot axis for this bell crank. As such, pivotal motion of the bell crank (actuated by operation of the motor and the drive linkage pushing on the bell crank) will pivot the bell crank in a first direction to simultaneously adjust the inlet door and outlet door in a flow-increasing direction, while pivotal motion of the bell crank (actuated by operation of the motor and the drive linkage pulling on the bell crank) will pivot the bell crank in a second direction to simultaneously adjust the inlet door and outlet door in a flow-decreasing direction.

BRIEF DESCRIPTION OF THE DRAWINGS

FIG. 3b is a perspective view of a door control assembly for the cooling shroud assembly of FIG. 1.

FIG. 10b is another perspective view of the internal combustion engine of FIG. 10a, with the exhaust system reflector being in a reflecting position for acoustic emissions being discharged from the exhaust system.

FIG. 11b a partially exploded, perspective view of the engine assembly shown in FIG. 10a.

FIG. 11c is an end view of engine assembly application shown in FIG. 11a.

DETAILED DESCRIPTION

Figure 1:
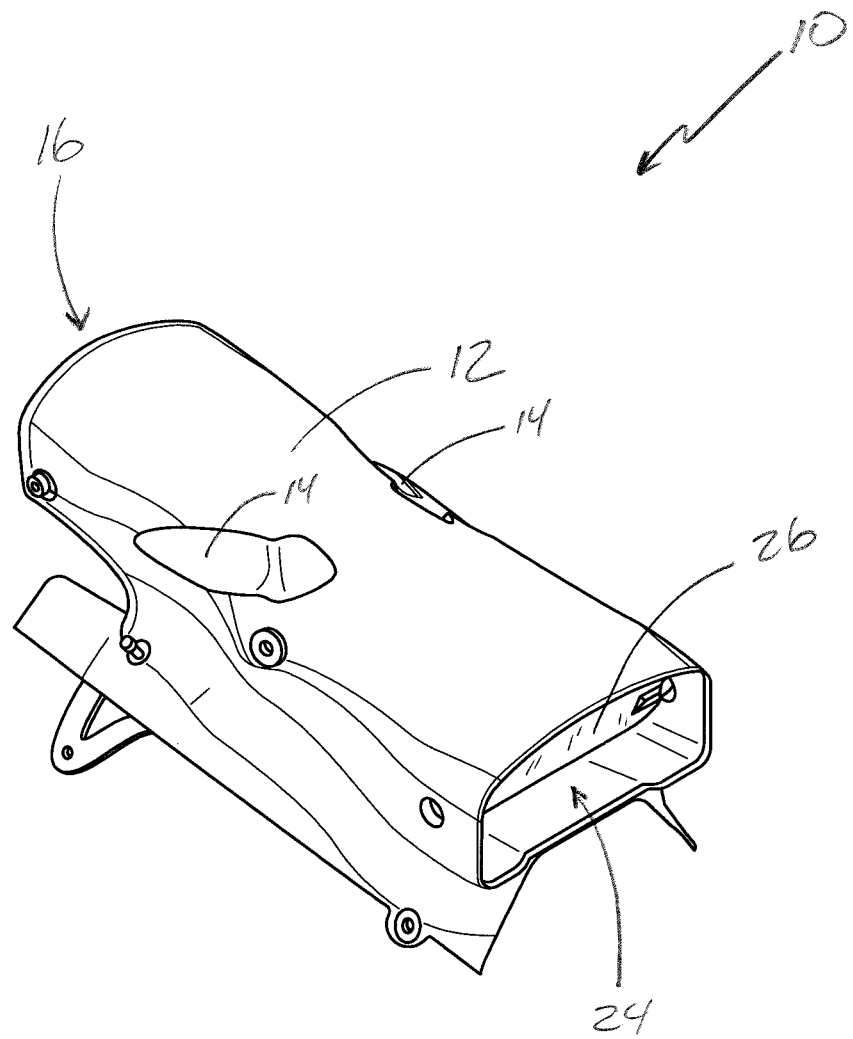
FIG. 1 is a perspective view of a dual flap active inlet cooling shroud assembly.
Figures 2B, 2C:
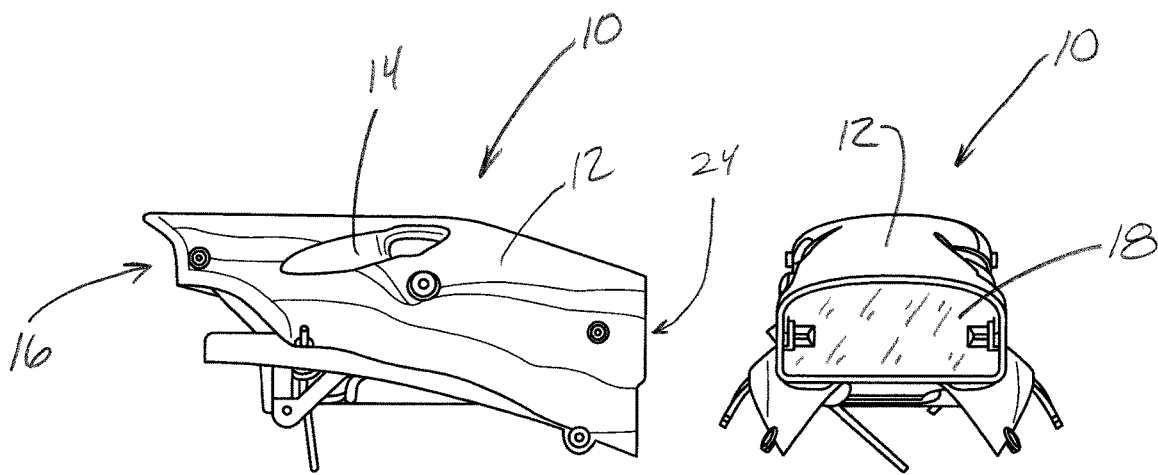
FIGS. 2a, 2b, and 2c are views of the cooling shroud assembly of FIG. 1 from the bottom, side, and front.
Figure 2A:
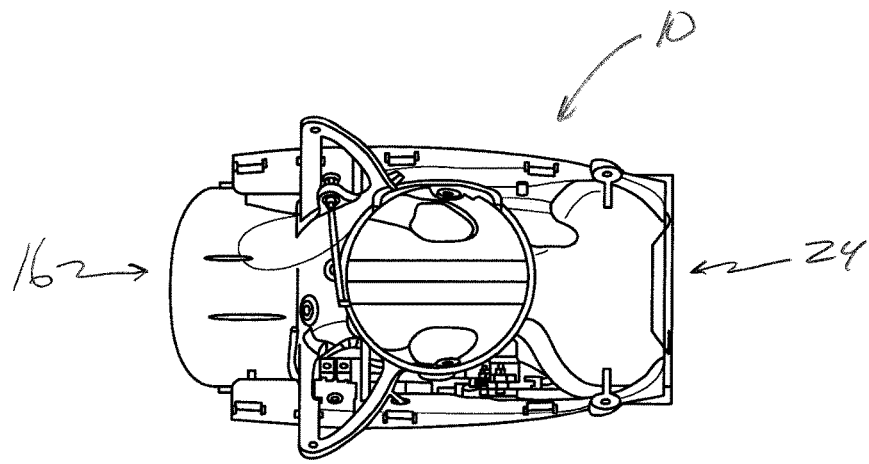

One embodiment of a cooling shroud assembly for an engine (e.g., an internal combustion engine) is disclosed in FIGS. 1-3b and is identified by reference numeral 10. The cooling shroud assembly 10 includes a shroud body 12 that has a pair of spark plug apertures 14 (that extend through this shroud body 12) for a corresponding engine configuration. The shroud body 12 includes an inlet or an inlet end 16 and an oppositely disposed outlet or outlet end 24. An inlet door or flap 18 controls the flow into an interior flowpath (through the inlet 16) defined at least in part by the shroud body 12, while an outlet door or flap 26 controls the flow out of this interior flowpath through the outlet 24.

Figure 3A:
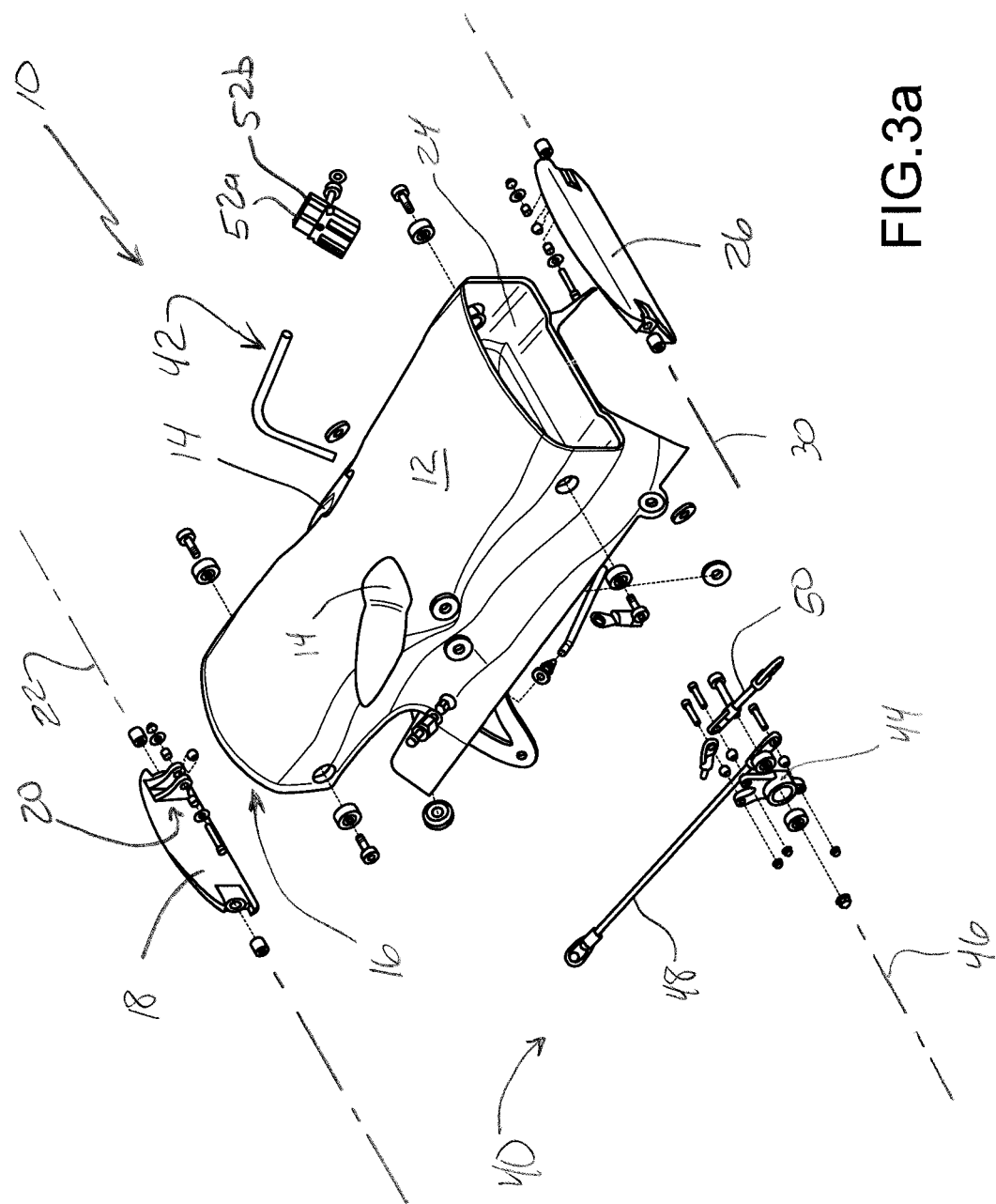
FIG. 3a is an exploded, perspective view of the cooling shroud assembly of FIG. 1.

A door or flap control assembly 40 is illustrated in FIGS. 3a and 3b. This control assembly 40 includes a door or flap cable assembly 42 (e.g., a drive linkage) that is interconnected with a bell crank or pivot 44. A fixed pivot axis 46 is associated with this bell crank 44, such that the bell crank 44 is pivotable about this fixed pivot axis 46. The door cable assembly 42 connects to the bell crank 44 at a location that is spaced from its fixed pivot axis 46. A control arm or linkage 48 is interconnected with the bell crank 44 at a location that is also spaced from its fixed pivot axis 46. This control arm 48 extends to and is interconnected with the inlet door 18 (via a clevis 20) at a location that is spaced from its pivot axis 22. Another control arm or linkage 50 is interconnected with the bell crank 44 at a location that is also spaced from its fixed pivot axis 46. This control arm 50 extends to and is interconnected with the outlet door 26 (via a clevis 28) at a location that is spaced from its pivot axis 30.

Figure 7:
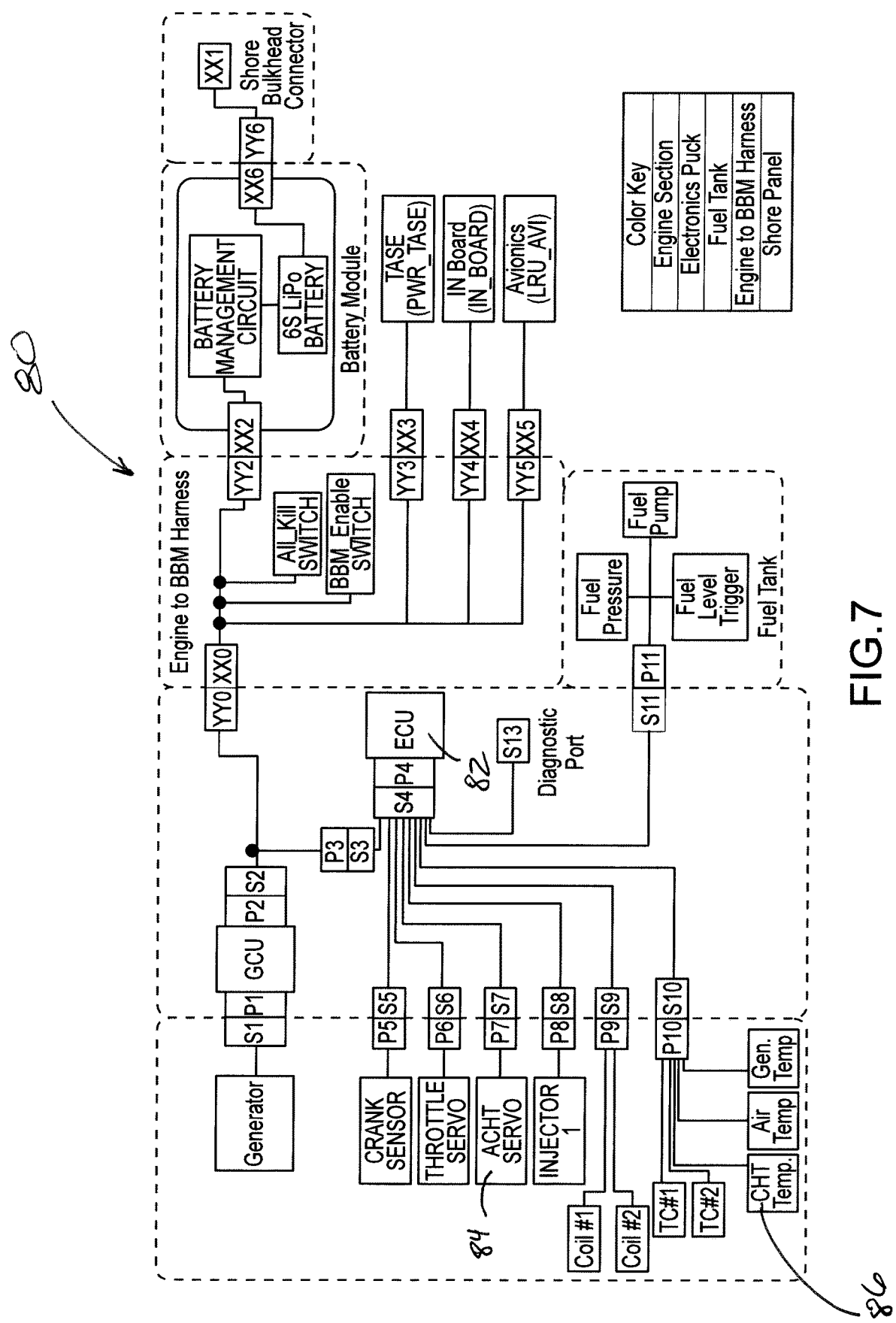
FIG. 7 is the electrical block diagram for an engine module that incorporates the cooling shroud assembly of FIG. 1, including the connection from the ECU to the active inlet.

Motion of the door cable assembly 42 may be provided by a servomotor (e.g., servomotor 84 in FIG. 7). When the door cable assembly 42 pushes on the bellcrank 44, both the inlet door 18 and outlet door 26 are moved in an opening direction by approximately the same corresponding amount (via pivotal motion about their respective pivot axis 22, 30). When the door cable assembly 42 pulls on the bellcrank 44, both the inlet door 18 and outlet door 26 are moved in a closing direction by the approximately same corresponding amount (via pivotal motion about their respective pivot axis 22, 30). The dual, synchronous response flaps 18, 26 function as a temperature-controlling device for a cylinder and cylinder head of an engine that incorporates the cooling shroud assembly 10.

The configuration of the cooling shroud assembly 10 is unique from single flap/door configurations and is driven by a single servo drive. This configuration for the cooling shroud assembly 10 allows for more precise cylinder and cylinder head temperature control than other configurations driven by a single servo drive. This configuration for the cooling shroud assembly 10 also integrates aerodynamically into the surrounding engine core shroud and aircraft fuselage. The cooling shroud body 12 is located above the engine, facing the airflow coming over the top of the propeller for an aircraft or aerial vehicle application. More specifically, the adjustable inlet door 18 for the cooling shroud assembly 10 faces or projects in the direction of the incoming airflow, while the adjustable outlet door 26 for the cooling shroud assembly 10 faces in the opposite direction.

Figure 4:
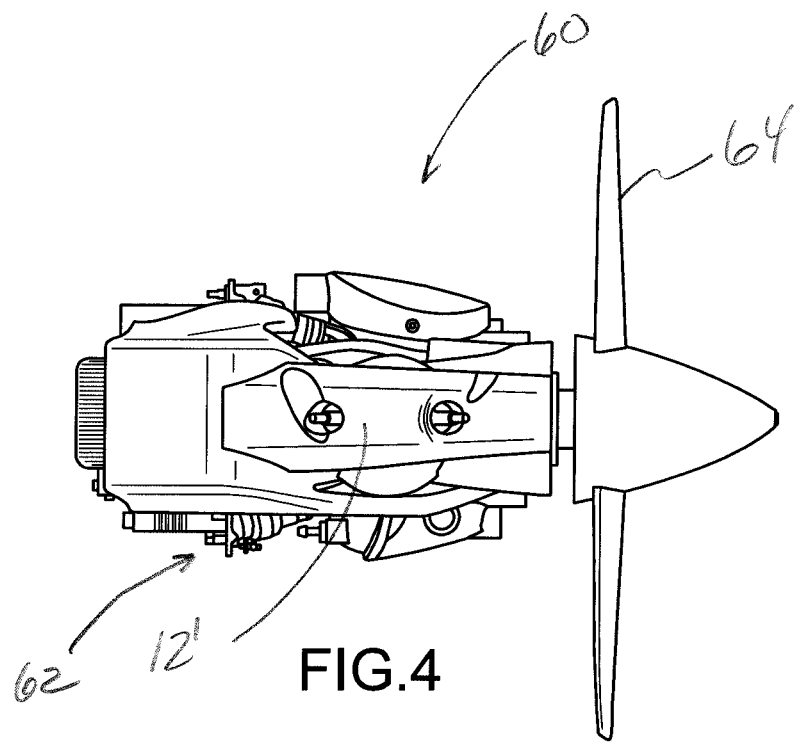
FIG. 4 is a top-view of an engine module that uses a variation of the dual active inlet cooling shroud assembly of FIG. 1 (with the spark plugs exposed (no spark plug caps in place)).
Figure 5:
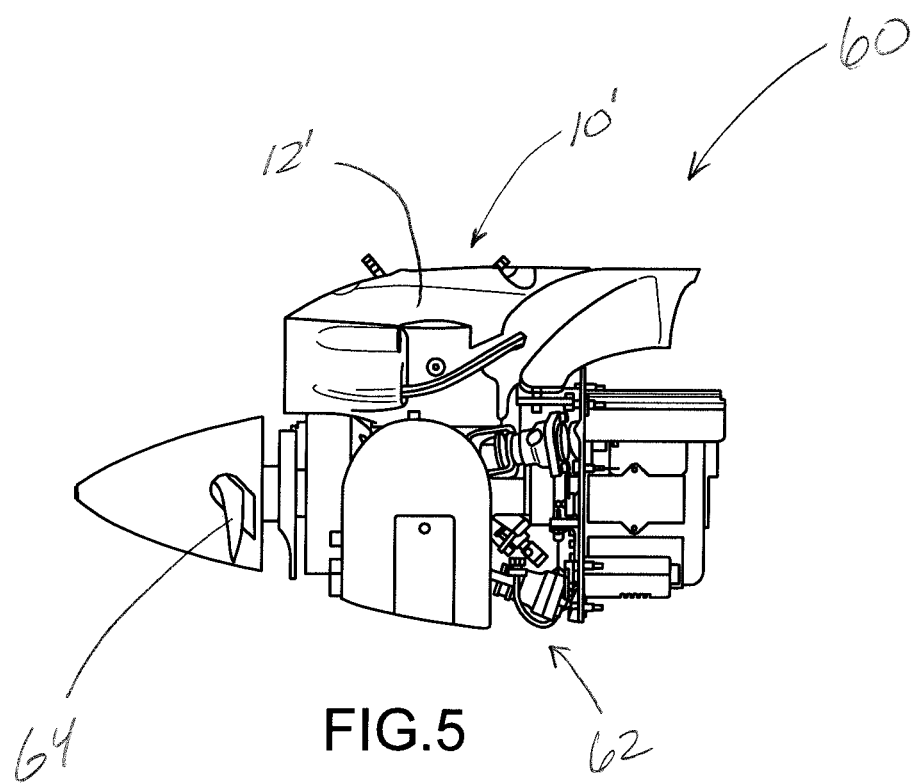
FIG. 5 is a side-view of the engine module shown in FIG. 4.

FIGS. 4 and 5 are views of an embodiment of an engine module or engine assembly that is identified by reference numeral 60, and that is used for an aircraft or aerial vehicle application. The engine module 60 includes an engine 62 (e.g., internal combustion engine). Operation of the engine 62 rotates a propeller 64. The engine module 60 is of a push-type configuration and includes a variation of the cooling shroud assembly 10 of FIGS. 1-3b. The cooling shroud assembly 10' of FIGS. 4-5 accommodates the engine 62 having a different arrangement of spark plugs compared to the cooling shroud assembly 10 of FIGS. 1-3b. The inlet for the cooling shroud assembly 10' is spaced further from the propeller 64 compared to its outlet for the illustrated push-type configuration.

Figure 6:
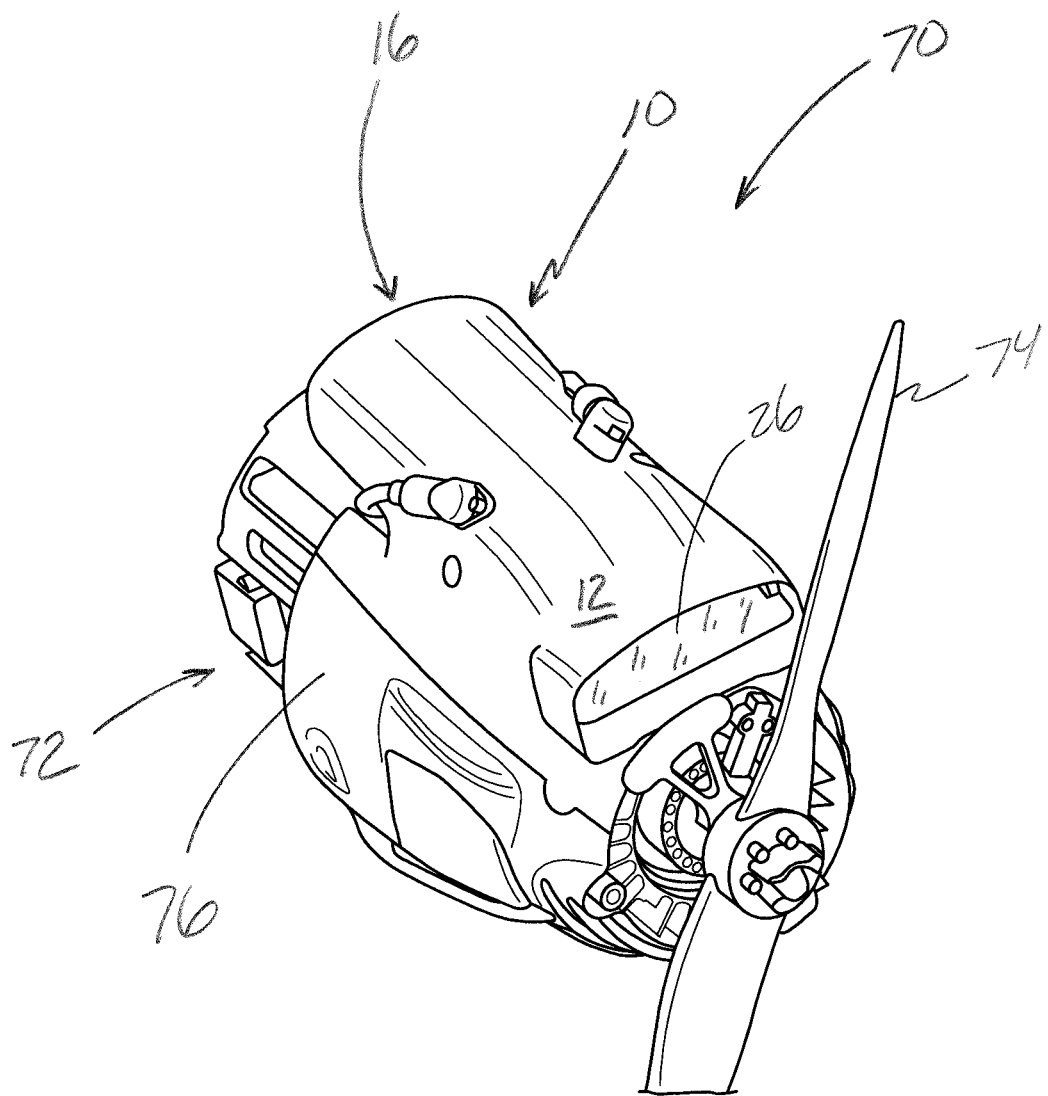
FIG. 6 is a perspective view the dual flap active inlet shroud assembly of FIG. 1, seamlessly integrated into a representative engine shroud configuration.

FIG. 6 presents an embodiment of an engine module or engine assembly that is identified by reference numeral 70, and that is used for an aircraft or aerial vehicle application. The engine module 70 includes an engine 72 (e.g., internal combustion engine). Operation of the engine 72 rotates a propeller 74. The engine module 70 again is of a push-type configuration and includes the cooling shroud assembly 10 of FIGS. 1-3b.

The rate of airflow is controlled by the dual flap configuration/position of the two doors/flaps 18, 26 for the cooling shroud assembly 10. The position of the two doors/flaps 18, 26 is synchronously controlled by the above-noted control assembly 40. FIG. 7 illustrates an electrical schematic for an engine module or engine assembly 80 (e.g., engine module 60 (FIGS. 4-5); engine 70 (FIG. 6)) that incorporates a cooling shroud assembly in accordance with the foregoing. The engine module 60 includes an engine control unit (ECU) 82 responding to the temperature data received from the temperature sensor 86 located on the cylinder head. The ECU 82 signal directs the appropriate response from the integrated servomotor 84 of the corresponding engine. FIG. 7 further illustrates an electrical schematic including the signal (P10) and response (P7) mechanism via the ECU module 82.

The design of the cooling shroud assembly 10 allows for the removal of the shroud assembly 10 without first removing the spark plugs from the associated engine of an engine module or assembly. This feature enables expedited maintenance and repair activity on the mating engine assembly without first removing the body 12 of the cooling shroud assembly 10. The engine module 60 in FIG. 4 depicts the open access to the spark plug assembly from a top view. Further advantages of the design configuration for the cooling shroud assembly 10 includes ease of manufacturability and flexible parts production rate (i.e.; custom/demand-driven printing). Andersen connectors (housings) 52a, 52b are integrated into the production (printing) of the shroud assembly 10, further reducing shroud final assembly time, improving aerodynamic properties, and improving part reliability. The connector 52a is used to attach an external 12V source to the power the glow plug (ground station). The connector 52b is used to complete the connection from the external source to the glow plug ground attachment above the vibration isolation mount.

Figure 8:
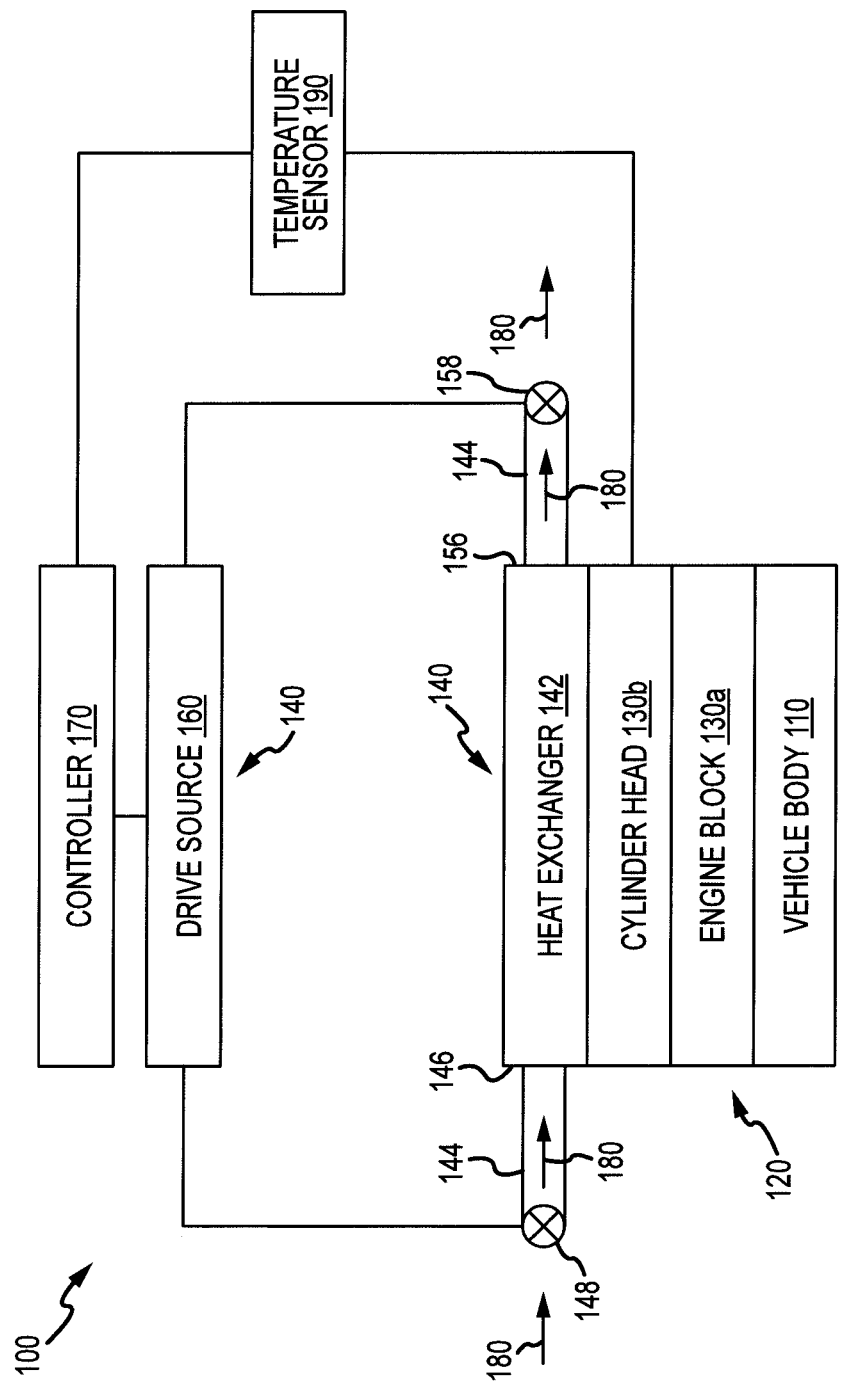
FIG. 8 is a schematic of a vehicle that includes a temperature control system that utilizes a pair of simultaneously-adjustable flow controllers that are spaced from one another along a cooling medium flowpath.

FIG. 8 is a schematic of a vehicle 100 having a vehicle body 110 and an engine 120 at least generally in accordance with the foregoing. The vehicle 100 may be of any appropriate type and/or configuration, including aircraft (e.g., unmanned aerial vehicle; radio-controlled aircraft), watercraft (manned, such as a jet ski or boat; unmanned, such as radio-controlled boat), and the like. The vehicle body 110 of course may be adapted for the requirements of the vehicle 100, as may the engine 120. The engine 120 may be characterized as part of a propulsion system for the vehicle 100, which of course is used to advance the vehicle 100 (including the vehicle body 110 and components incorporated by the vehicle body 110). In the case of an aircraft, this propulsion system may include one or more engines 120 and one or more propellers, and including both for both tractor or pull-type configurations and pusher-type configurations.

The engine 120 of FIG. 8 includes an engine or cylinder block 130a and a cylinder head 130b that is appropriately mounted to the engine block 130a (e.g., an internal combustion engine configuration). The engine block 130a and/or the cylinder head 130b may be characterized as a heat source. The engine block 130a may be of any appropriate configuration (e.g., incorporating one or more cylinders, with each cylinder having a corresponding reciprocating piston disposed therein; where a crankshaft of the engine 120 (disposed within a crankshaft housing on which the engine block 130a may be mounted) reciprocates one or more of these pistons in a timed relation). The cylinder head 130b closes the upper end of the cylinder(s) being utilized by the engine block 130a, and may be configured to direct air and/or fuel into each of the cylinders of the engine 120, as well as to allow exhaust gases to be discharged from each of the cylinders of the engine 120. The cylinder head 130b may also include intake and/or exhaust valves, spark plugs, and the like.

The engine 120 of FIG. 8 further includes a temperature control system 140, which in turn includes a heat exchanger 142. This heat exchanger 142 may be of any appropriate configuration, for instance in the form of one or more fins extending from the cylinder head 130b of the engine 120. The heat exchanger 142 could also be in form of a radiator (e.g., where a fluid (e.g., air) flows through the radiator to reduce the temperature of a coolant that flows through the radiator within a conduit/tubing arrangement, and where fins may also be used by the radiator to dissipate heat from the coolant flowing through the conduit/tubing arrangement of the radiator).

The temperature control system 140 for the engine 120 includes what may be characterized as a cooling medium flowpath 144 (only being schematically illustrated in FIG. 8). The flow/flow rate through this cooling medium flowpath 144 could be due to the movement of the vehicle 100, could be due to a forced-flow configuration (e.g., one or more fans), or both. In any case, the cooling medium flowpath 144 is configured to direct a flow of a cooling medium 180 of any appropriate type (e.g., air or a liquid, such as water) through or over/around/past the heat exchanger 142 (e.g., such that one or more heat dissipating surfaces of the heat exchanger 142 are exposed to the cooling medium 180 within the cooling medium flowpath 144). The cooling medium flowpath 144 may also be characterized as a configuration that guides a flow of the cooling medium 180 so as to fluidly interact with the heat exchanger 142 to remove heat therefrom by convective heat transfer. In any case, the heat exchanger 142 may be characterized as having a cold side 146 and a hot side 156. The cold side 146 of the heat exchanger 142 coincides with the "inlet" for the cooling medium 180 that provides the cooling function (prior to the cooling medium 180 being heated by the heat exchanger 142). The hot side 156 of the heat exchanger 142 coincides with the "outlet" for the cooling medium 180 that provides the cooling function (after the cooling medium 180 has been heated by the heat exchanger 142). In one embodiment, the cold side 146 of the heat exchanger 142 is spaced from the hot side 156 of the heat exchanger 142 in the direction of motion or travel by the vehicle 100. Other relative orientations for the cold side 146 and hot side 156 of the heat exchanger 142 may be appropriate.

In the case where the heat exchanger 142 is incorporated by the cylinder head 130b (having a plurality of cooling fins or the like), the cooling medium flowpath 144 may be of a configuration to direct a flow of the cooling medium 180 (e.g., air) over/through these fins. The spacing between the shroud assembly (1, 2, 3) and the engine from the embodiment of FIGS. 1-7 (e.g., its cylinder head) may be equated with the cooling medium flowpath 144 from the FIG. 8 embodiment. As such, the cooling medium 180 in this instance would not necessarily be entirely enclosed by the cooling medium flowpath 144. In the case where the heat exchanger 142 is in the form of a radiator, the radiator could be disposed within ducting that defines the cooling medium flowpath 144 (the cooling medium 180 could be enclosed by the cooling medium flowpath 144 in this instance), or a first ducting section that defines one part of the cooling medium flowpath 144 could direct the cooling medium 180 to the cold side of the radiator and a second ducting section that defines another part of the cooling medium flowpath 144 could direct the cooling medium 180 away from the hot side of the radiator (i.e., after the cooling medium 180 has passed through the radiator). A first ducting section for the cooling medium flowpath 144 could direct the cooling medium 180 into an enclosed interior of the heat exchanger 142 through its cold side 146, and a second ducting section for the cooling medium flowpath 144 could direct the cooling medium 180 out of the enclosed interior of the heat exchanger 142 through its the hot side 156 (e.g., the heat exchanger 142 could be of a shell-and-tube configuration). One embodiment has the heat exchanger 142 being incorporated by the engine block 130a (e.g., the cooling medium 180 could be directed through one or more passages in the engine block 130a, for instance utilizing an intake header/manifold and an outlet header/manifold). In each described instance, the flow of cooling medium 180 removes heat from the heat exchanger 142.

The heat exchanger 142 may be characterized as being disposed between a pair of flow controllers that are utilized by the temperature control system 140, for instance a cold-side flow controller 148 and a hot-side flow controller 158 in accordance with the configuration shown in FIG. 8 (i.e., the cold-side flow controller 148 and hot-side flow controller 158 are disposed in spaced relation along the cooling medium flowpath 144). The flow controllers 148, 158 may be of any configuration to regulate the flow/flow rate through the cooling medium flowpath 144 (e.g., throttle valves). The inlet door 18 of the cooling shroud assembly 10 from the embodiment of FIGS. 1-7 may be equated with the cold-side flow controller 148 for the embodiment of FIG. 8, while the outlet door 26 of the cooling shroud assembly 10 may be equated with the hot-side flow controller 158 for the embodiment of FIG. 8. Simultaneously moving the free ends of the inlet door 18 and the outlet door 26 away from the engine will increase the airflow flow through the shroud body 12 (and thereby accommodate an increased heat transfer from the engine), while simultaneously moving the free ends of the inlet door 18 and the outlet door 26 toward the engine will decrease the airflow through the shroud body 12 (and thereby accommodate a reduced heat transfer from the engine).

The cold-side flow controller 148 and the hot-side flow controller 158 from the FIG. 8 embodiment are operatively interconnected with an appropriate drive source 160 (e.g., one or more servo motors) of the temperature control system 140. A controller 170 of the temperature control system 140 may be used to control operation of the drive source 160, and thereby the position of each of the cold-side flow controller 148 and the hot-side flow controller 158. Typically each flow controller 148, 158 will ultimately be disposed in a common flow-controlling position after any adjustment by the drive source 160 (via the controller 170), for instance to provide a commonly-sized orifice through which the flow of cooling medium 180 is directed at the locations of the controllers 148, 158).

The controller 170 and the drive source 160 each may be of any appropriate type/configuration and may be implemented by the temperature control system 140 in any appropriate manner. Activation of the drive source 160 (whether in the form of a single motor/actuator or a pair of motors/actuators, but albeit through a common controller 170) may simultaneously adjust the cold-side flow controller 148 and the hot-side flow controller 158 the same amount and in an increasing flow/flow rate direction (to increase the heat transfer between the cooling medium 180 and the cylinder head 130b/engine block 130a; e.g., to dispose the first flow controller 148 and the second flow controller 158 in a common flow-regulating position), or may simultaneously adjust the cold-side flow controller 148 and the hot-side flow controller 158 the same amount and in a decreasing flow/flow rate direction (to decrease the heat transfer between the cooling medium 180 and the cylinder head 130b/engine block 130a; e.g., to dispose the first flow controller 148 and the second flow controller 158 in a common flow-regulating position). The drive source 160 (including where the drive source 160 includes a separate first motor/actuator for the first flow controller 148 and a separate second motor/actuator for the second flow controller 158) may adjust the first flow controller 148 and the second flow controller 158 other than on a simultaneous basis (although the first flow controller 148 and the second flow controller 158 will typically be adjusted the same amount in either an increasing flow/flow rate direction or a decreasing flow/flow rate direction; e.g., to ultimately dispose the first flow controller 148 and the second flow controller in a common flow-regulating position). The drive source 160 could adjust the first flow controller 148 and the second flow controller 158 other than on a simultaneous basis, but where at least part of the adjustment of the first flow controller 148 and the adjustment of the second flow controller 158 overlap to at least a degree (although the first flow controller 148 and the second flow controller 158 will still typically be adjusted the same amount in either an increasing flow/flow rate direction or a decreasing flow/flow rate direction; e.g., to dispose the first flow controller 148 and the second flow controller in a common flow-regulating position). The flow controllers 148, 158 could also be sequentially adjusted by the drive source 160.

Feedback control may be incorporated by the temperature control system 140. A temperature sensor 190 may be mounted on or otherwise associated with a heat source of the engine 120 (e.g., engine block 130*a*; cylinder head 130*b*). A signal that is indicative of the monitored temperature from the temperature sensor 190 may be used by the controller 170 to determine how (whether in an increasing-flow direction or a decreasing-flow direction) and by how much the drive source 160 should adjust the cold-side flow controller 148 and the hot-side flow controller 158.

Figure 9:
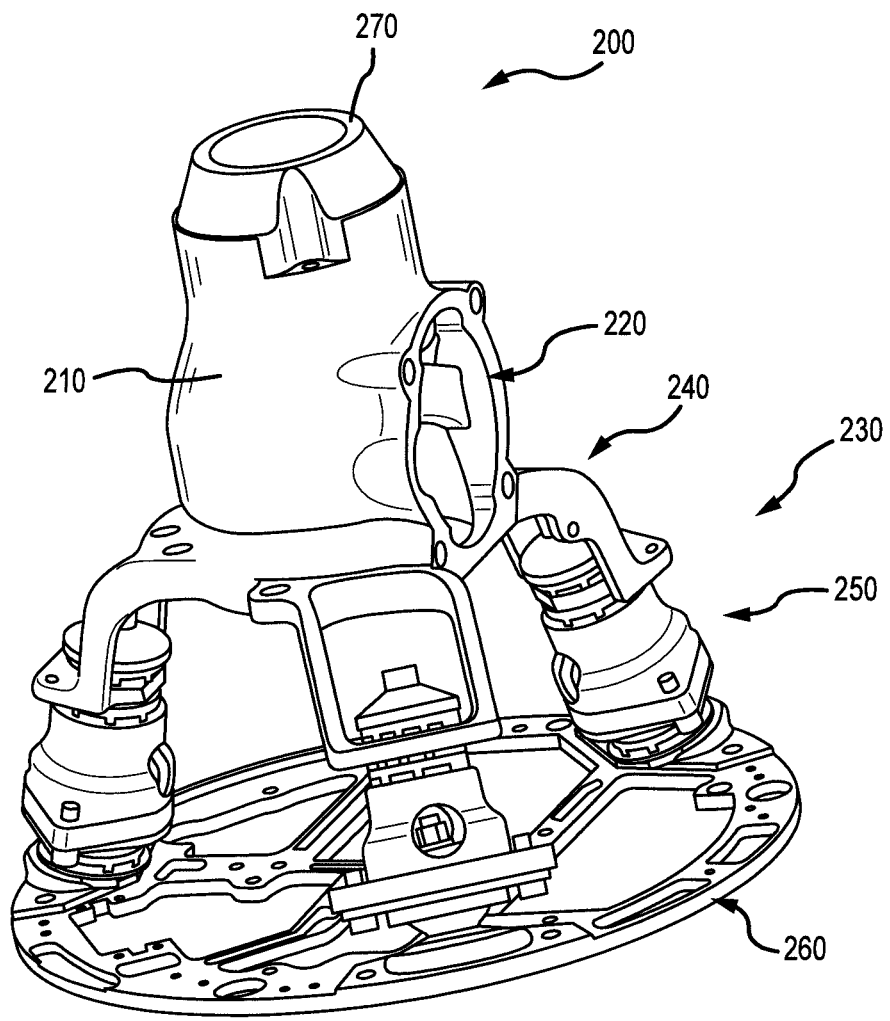
FIG. 9 is a perspective view of a portion of another embodiment of engine assembly, where part of an engine assembly mounting system is integrally formed with a crankcase housing of the engine assembly.

A representative engine assembly is illustrated in FIG. 9 and is identified by reference numeral 200, and may utilize any of the engines addressed herein and in combination with a cooling shroud assembly in accordance with the foregoing. The engine assembly 200 includes an engine case or crankcase housing 210 (in which a rotatable crankshaft may be disposed). An engine or cylinder block may be mounted to the crankcase housing 210 at a mounting location 220, and a cylinder head may be appropriately mounted to this engine block. The engine block may be of any appropriate configuration (e.g., incorporating one or more cylinders, with each cylinder having a corresponding reciprocating piston disposed therein; where a crankshaft of the engine (disposed with the crankshaft housing 210) reciprocates one or more of these pistons in a timed relation). The cylinder head closes the upper end of the cylinder(s) being utilized by the engine, and may be configured to direct air and/or fuel into each of the cylinders of the engine as well as to allow exhaust gases to be discharged from each of the cylinders of the engine. The cylinder head may also include intake and/or exhaust valves, spark plugs, and the like. In any case, the cylinder head may be characterized as being aligned with the mounting location 220 on the crankcase housing 210, and may be directly or indirectly interconnected with the crankcase housing 210 at this mounting location 220.

The engine assembly 200 further includes an engine mounting system in the form of a plurality of mounting legs 230 that extend between the crankcase housing 210 and a mounting ring 260. The mounting ring 260 may be appropriately secured to an airframe of an aircraft or aerial vehicle (as well as to a bulkhead of a watercraft or power equipment). Any of the engine assemblies addressed herein may be secured to such an airframe using this type of mounting system as well. In this case, a propeller or propeller assembly (would be disposed beyond an end 270 of the crankcase housing 210.

Each mounting leg 230 includes an upper section 240 that may be integrally formed with the crankcase housing 210, as well as a lower section 250. The lower section 250 for each mounting leg 230 is in the form of a vibration damping or isolation subassembly, and each such lower section 250 may be of any appropriate configuration to provide the desired/required support and/or vibration damping/isolation effects.

Figure 10A:
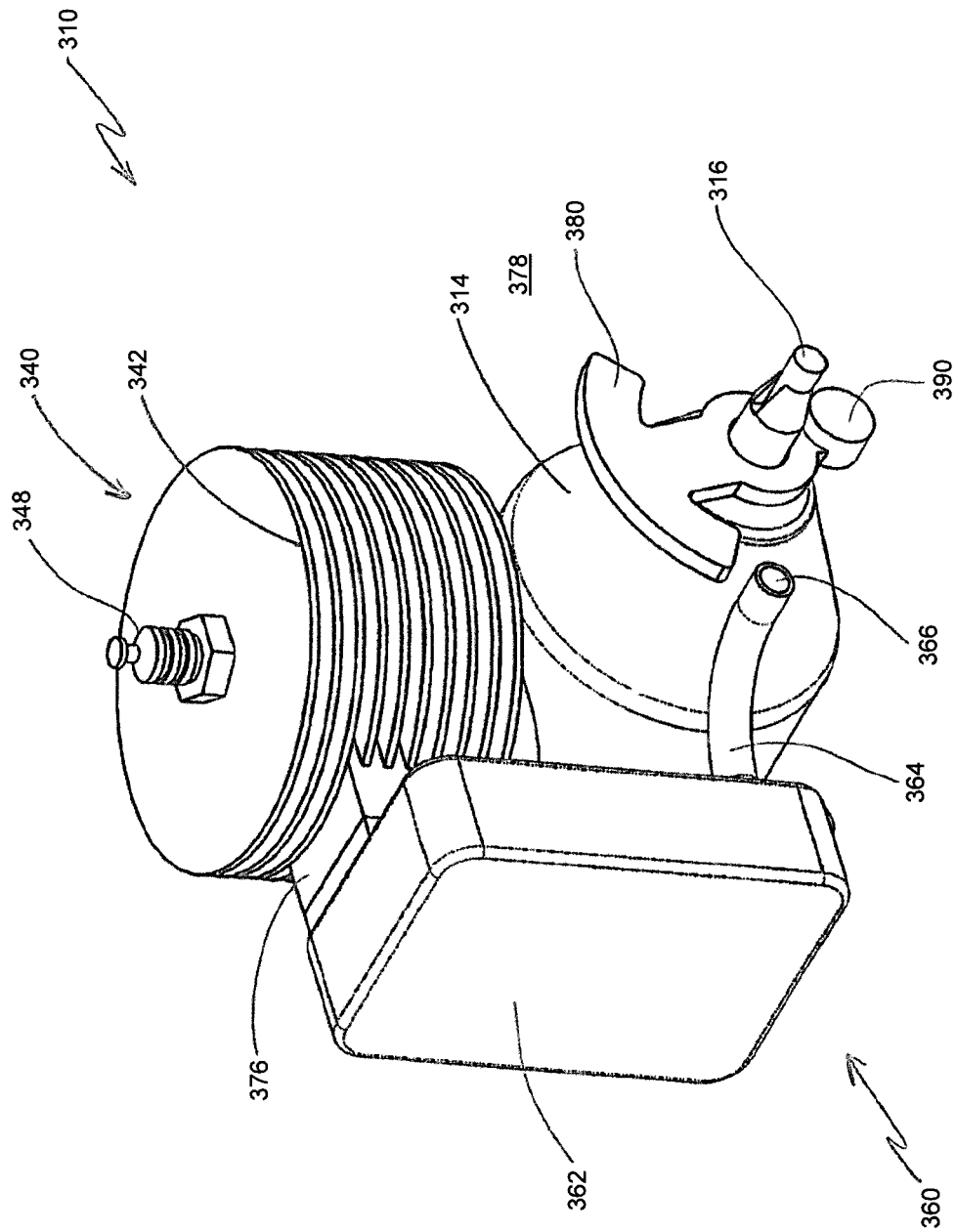
FIG. 10a is a perspective view of an embodiment of an internal combustion engine with an exhaust system reflector, with the exhaust system reflector being in a non-reflecting position for acoustic emissions being discharged from the exhaust system.
Figure 10A:
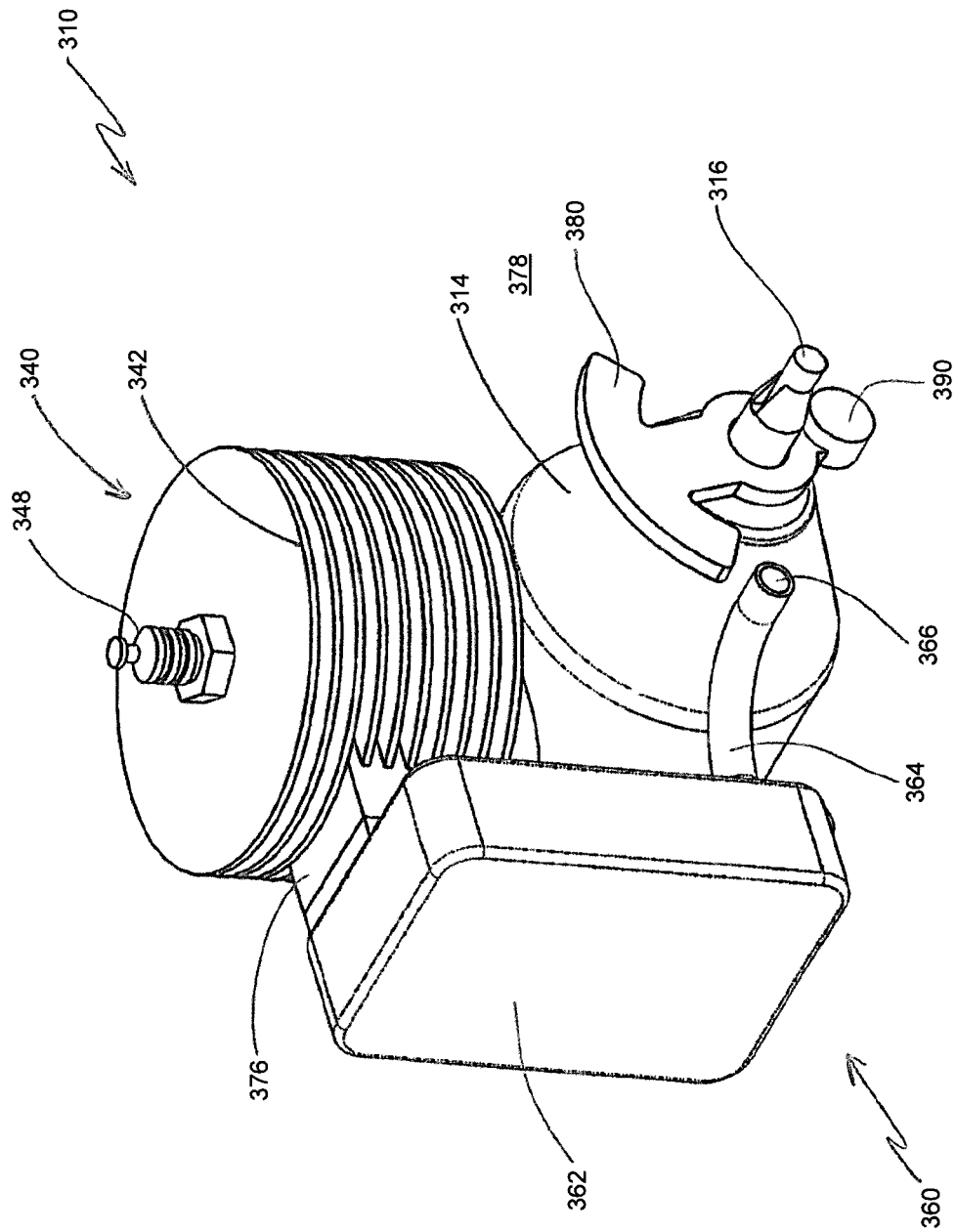

FIGS. 10*a* and 10*b* illustrate an embodiment of an internal combustion engine 310 that may be used by any of the engines addressed herein. Such an engine may be used in the propulsion of unmanned aerial vehicles, radio-controlled model aircraft, watercraft, and powered hand tools. The engine 310 includes a crankshaft 316, an engine case 314, a cylinder 340 (which may include one or more cooling fins 342 for removing heat generated during operation of the engine 310), one or more spark plugs or other igniters 348, an exhaust system 360, an exhaust system reflector 380 located downstream of the exhaust system 360, and a counterweight 390. The exhaust system reflector 380 and associated counterweight 390 may not be required for all applications. One or more engine mounts 312 may be utilized for securing the engine 310 relative to a vehicle of any appropriate type, such as an unmanned aerial vehicle, or relative to any appropriate supporting structure. Rotation of the crankshaft 316 may rotate a propeller (e.g., in the case of an aircraft or aerial vehicle), may rotate an axle or propulsor (in the case of a watercraft), or the like.

The exhaust system 360 for the engine 310 includes a muffler 362 that receives a discharge or exhaust/exhaust flow from the cylinder 340 during operation of the engine 310 and via an exhaust header 376 that fluidly interconnects the cylinder 340 and the muffler 362. An exhaust conduit 364 (e.g., a tailpipe or stinger) extends from the muffler 362 and includes an open end or exhaust discharge port 366. As such, exhaust from the cylinder 340 flows into/through the header 376, then into/through the muffler 362, and then into/through the exhaust conduit 364 such that the exhaust exits through the open end 366 of the exhaust conduit 364 and into the atmosphere 378.

The exhaust flowing out of the exhaust system 360 through the open end 366 of the exhaust conduit 364 may be characterized as including two primary components—a bulk exhaust gas flow and acoustic emissions (e.g., one or more acoustic waves). The exhaust system reflector 380 is used by the engine 310 to force at least a part of the acoustic emissions (after having exited the exhaust system 360 through the open end 366 of the exhaust conduit 364, or at least after having reached the open end 366 of the exhaust conduit 364 back into the exhaust conduit 364 (via its open end 366) and preferably then back into the muffler 362. This reflection and/or obstruction of at least part of the acoustic emissions should dampen the acoustic emissions (e.g., further lower the acoustic emissions from operation of the engine 310; accommodate additional acoustic wave destructive interference) more than if the acoustic emissions make a single pass through the muffler 362 in proceeding from the cylinder 340 to the exhaust conduit 364. In addition to the foregoing, the reflector 380 should also be sized and timed (relative to the position of the open end 366 of the exhaust conduit 364) to reduce the potential of an unacceptable amount of the bulk exhaust gas flow being redirected or obstructed by the reflector 380, which could generate a back pressure in the muffler 362 and the cylinder 340, which in turn could adversely affect the operational performance of the engine 310. Preferably at most only a very minor amount of the bulk exhaust gas flow is reflected or obstructed by the exhaust system reflector 380 at any time. As such, the reflector 380 may also be referred to as an acoustic emissions valve 380 that is positioned downstream of the exhaust system 360. Such an acoustic emissions valve 380 may be moved into a position (by the crankshaft 316) so as to reflect or obstruct acoustic emissions, but may be moved out of this position (by the crankshaft 316) so as to not obstruct the bulk exhaust gas flow that has exited the exhaust system 360.

The exhaust system reflector 380 may be integrated with the crankshaft 316 in any appropriate manner so that the exhaust system reflector 380 and the crankshaft 316 rotate in unison—the reflector 380 will rotate 360° each time that the crankshaft 316 rotates 360° in the case of an engine with a single cylinder head. The reflector 380 could be separately attached to the crankshaft 316 in any appropriate manner, the reflector 380 could actually be part of the crankshaft 316, or the like. The counterweight 390 may also be incorporated by the crankshaft 316 in any appropriate manner so that the counterweight 390 and the crankshaft 316 also rotate in unison—the counterweight 390 will rotate 360° each time that the crankshaft 316 rotates 360°. The counterweight 390 could be separately attached to the crankshaft 316 in any appropriate manner, the counterweight 390 could actually be part of the crankshaft 316, or the like. In the illustrated embodiment, the counterweight 390 is mounted 180° from the reflector 380 relative to a rotational axis of the crankshaft 316 (e.g., the counterweight 390 and reflector 380 are disposed in opposing relation relative to the crankshaft 316). The counterweight 390 functions to maintain an appropriate rotational balance for the crankshaft 316. Other configurations where rotation of the crankshaft 316 moves the reflector 380 in the manner to be described herein may be utilized by the engine 310.

The reflector 380 is located outside of the exhaust system 360. The exhaust system 360 discharges to the atmosphere 378. As such, the reflector 380 is located within the atmosphere 378. In order to reflect at least part of the acoustic emissions back into the exhaust system 360, but to not reflect any substantial portion of the bulk exhaust gas flow back into the exhaust system 360, the reflector 380 is rotated into and out of alignment with the open end 366 of the exhaust conduit 364 through rotation of the crankshaft 316. "In alignment" in relation to the relative positioning of the reflector 380 and the open end 366 of the exhaust conduit 364 means that at least part the flow out of the open end 366 of the exhaust conduit 364 impacts the reflector 380 in a manner that reflects at least part of this flow back into the exhaust system 360 (where this flow is in the form of acoustic emissions in this instance). "Out of alignment" in relation to the relative positioning of the reflector 380 and the open end 366 of the exhaust conduit 364 means that the flow out of the open end 366 of the exhaust conduit 364 does not impact the reflector 380 in a manner that obstructs flow out of the exhaust system 360 (where this flow is in the form of the bulk exhaust gas flow in this instance). It should be appreciated that in certain instances the reflector 380 will be blocking/reflecting only a portion of the flow exiting the exhaust system 360 (e.g., as the reflector 380 is being rotated into alignment with the open end 366 of the exhaust conduit 364, and where the flow in this instance is in the form of acoustic emissions).

Figure 10C:
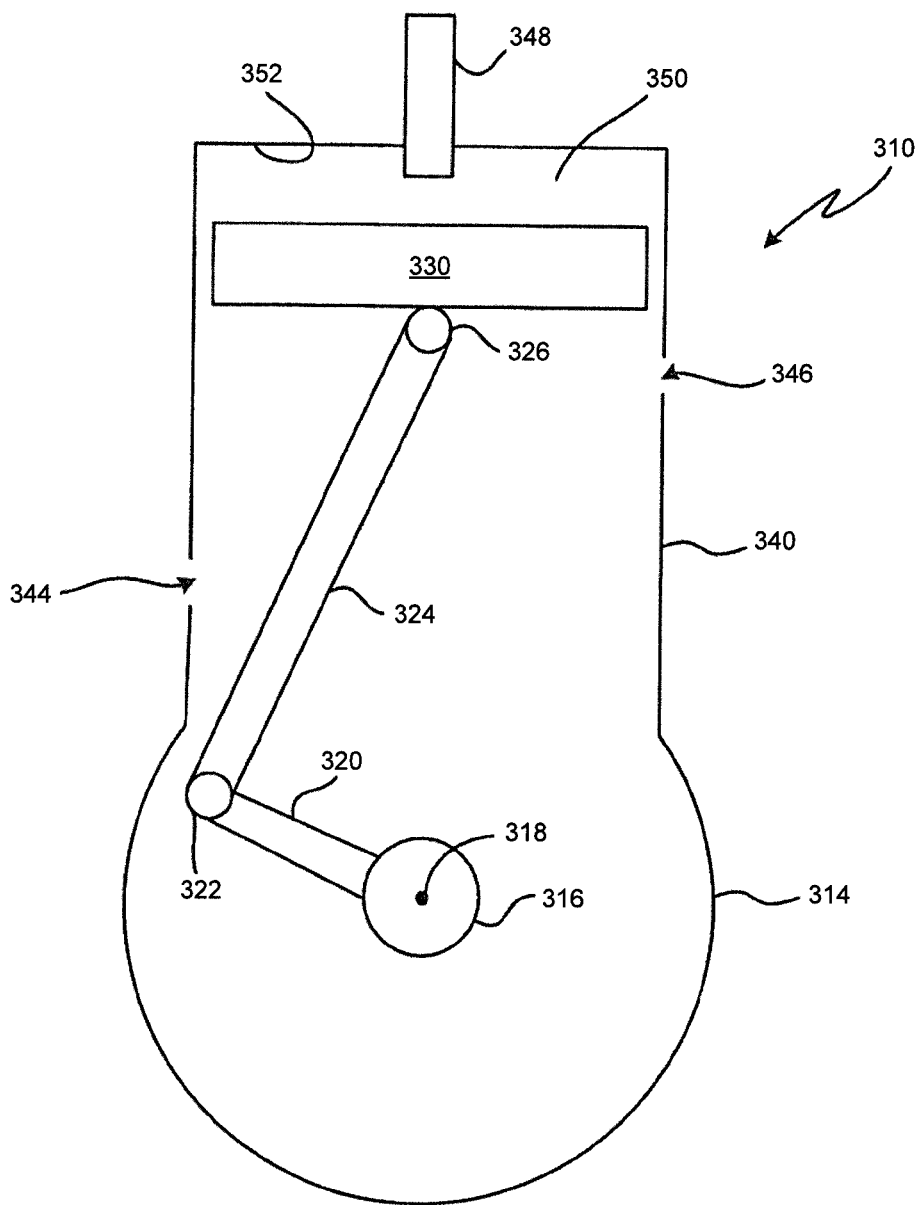
FIG. 10c is a schematic of one configuration of a cylinder for the internal combustion engine of FIG. 10a, along with a corresponding piston.

A schematic of a portion of the internal combustion engine 310 is presented in FIG. 10c. The engine 310 may use one or more cylinders 340, and furthermore may be of a two-cycle configuration. A piston 330 reciprocates within the cylinder 340. In this regard, a connecting rod 320 is appropriately fixed relative to a crankshaft 316 and extends to a pivot 322. A piston rod 324 extends from the pivot 322 to another pivot 326 associated with the piston 330. As such, rotation of the crankshaft 316 about its rotational axis 318 will drive the piston 330 up and down in alternating fashion (in the view shown in FIG. 10c).

The cylinder 340 includes an intake port 344 and an exhaust port 346. One or more valves may be associated with one or more of the ports 344, 346. An air/fuel mixture may be directed into the engine case 314 through the intake port 344 during movement of the piston 330 from a bottom dead center position toward a top dead center position (after the piston 330 passes the intake port 344). This movement of the piston 330 also compresses the air/fuel mixture that is contained within the combustion chamber 350 (located between the piston 330 and a closed end 352 of the cylinder 340, and directed into the chamber 350 through the intake port 344/engine case 314). At some point in time during the movement of the piston 330 toward its top dead center position, the piston 330 will isolate the exhaust port 346 from the combustion chamber 350.

When the piston 330 reaches (or is at least near) its top dead center position, a spark plug or igniter 348 ignites the air/fuel mixture within the combustion chamber 350, which drives the piston 330 from its top dead center position back toward its bottom dead center position. At some point in time during the movement of the piston 330 toward its bottom dead center position, the exhaust port 346 will be exposed to the combustion chamber 350 to allow a flow of exhaust out of the combustion chamber 350, through the exhaust port 346, and into the above-discussed exhaust system 360 (e.g., into/through the exhaust header 376, and then into/through the muffler 362, and then into/through the exhaust conduit 364). Movement of the piston 330 toward its bottom dead center position will at some point in time compress the air/fuel mixture that has previously entered the engine case 314 through the intake port 344.

Figure 11A:
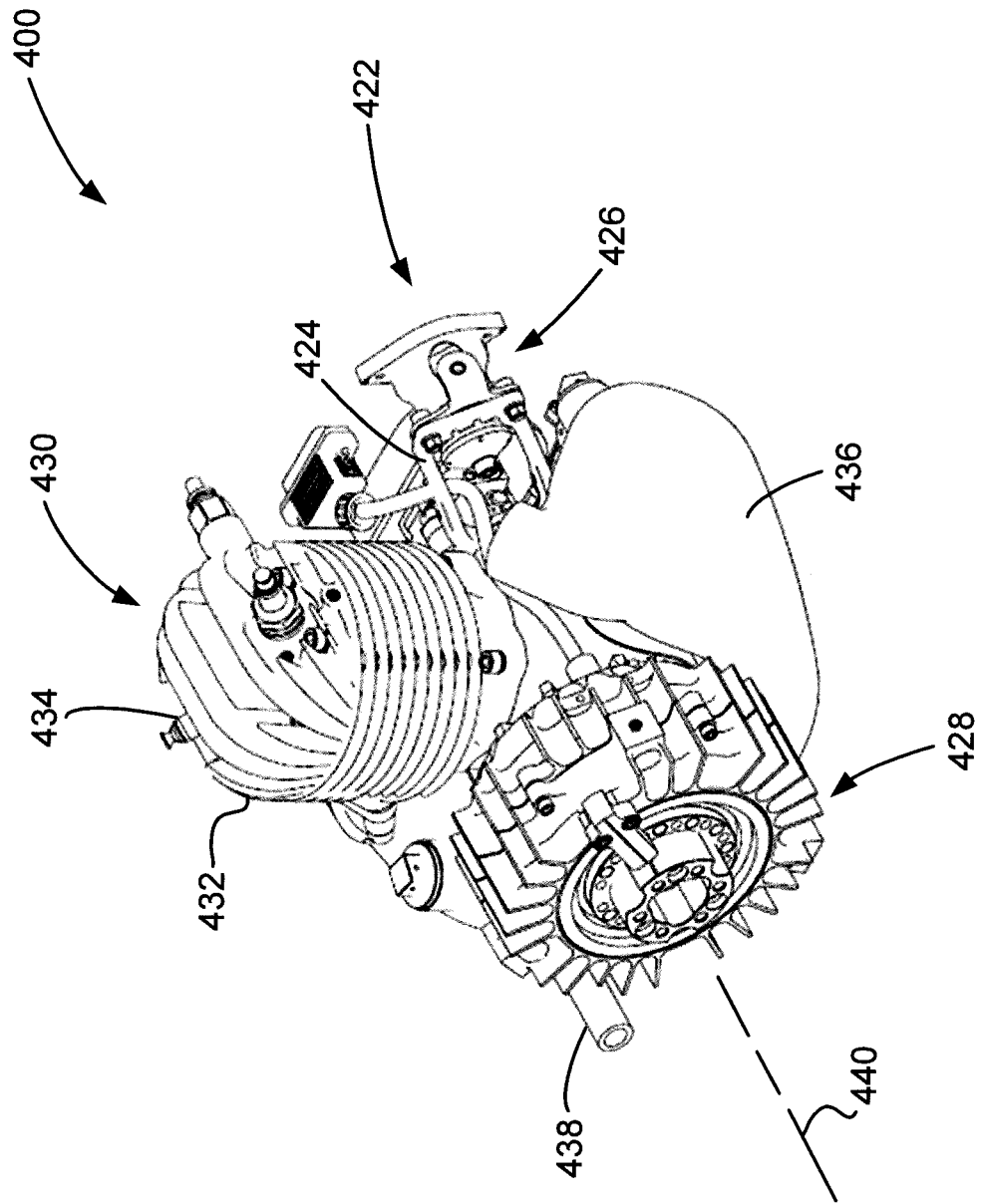
FIG. 11a is a perspective view of an embodiment of an engine assembly for an aircraft or aerial vehicle application, that uses the type of mounting system shown in FIG. 9, and that uses the type of muffler shown in FIGS. 1-6.
Figure 11B:
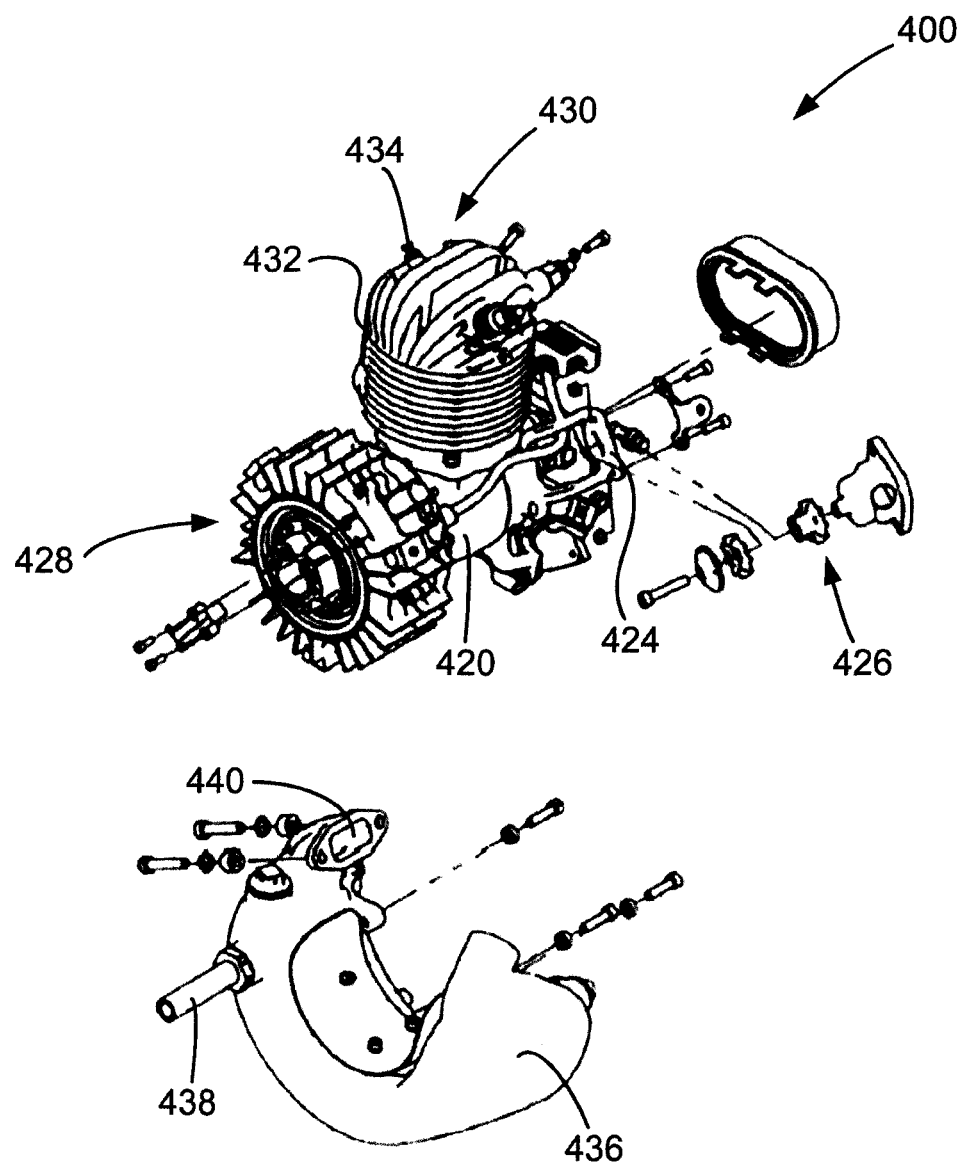
Figure 11C:
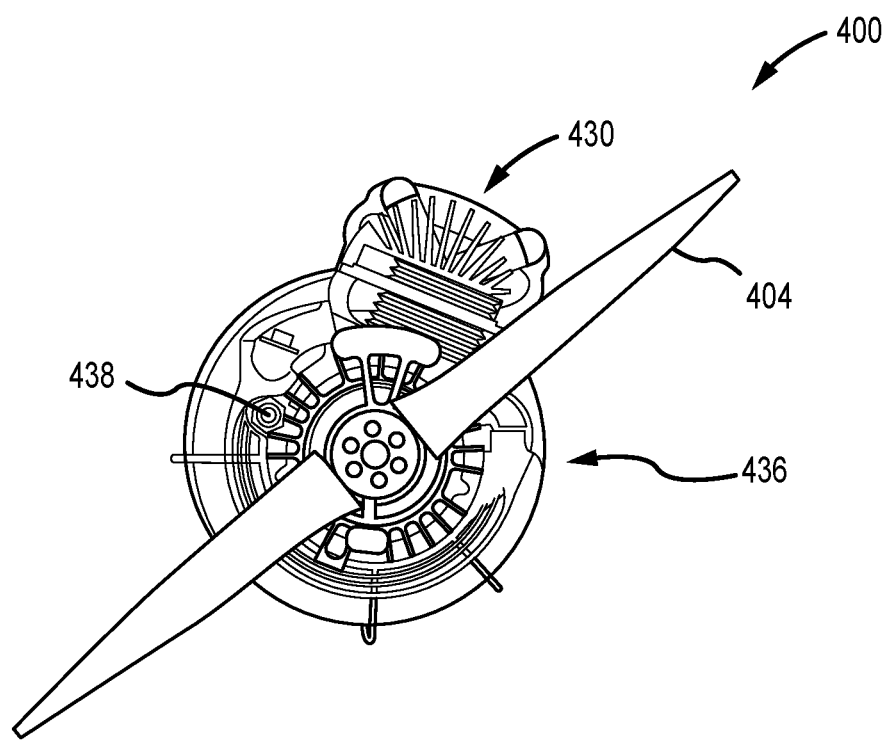

A representative engine assembly is illustrated in FIGS. 11a-11c and is identified by reference numeral 400. The engine assembly 400 includes an engine case or crankcase housing 420 in which a rotatable crankshaft may be disposed (for instance at least generally in accordance with crankcase housing 210—FIG. 9). A relevant portion of internal combustion engine 430 may be mounted to the crankcase housing 420 at least generally in the above-noted manner. In the illustrated embodiment, the engine 430 includes a single cylinder head 432 having a single combustion chamber. An air/fuel mixture within this combustion chamber is ignited by a pair of spark plugs 434. Exhaust gases may be discharged from this combustion chamber into a muffler 436, and thereafter may be directed into the environment through a stinger 438. The engine assembly 400 shown in FIGS. 11a-11c is of a push-type configuration—the airframe or body of the associated aircraft/aerial vehicle would be pushed through the air by operation of the engine 430 and rotation of the associated propeller. The cooling shroud assembly 10 addressed herein, or a variation thereof, could be utilized by this engine assembly 400

The muffler 436 in FIGS. 11a and 11b proceeds about the crankcase housing 420 (e.g., about rotational axis 440), and may include an exhaust intake port 440. A flange associated with this exhaust intake port 440 may be secured to an exhaust header (not shown) of the cylinder head 432. The stinger 438 may extend out of an exhaust outlet port for the muffler 436.

The engine assembly 400 further includes an engine assembly mounting system in the form of a plurality of mounting legs 422 (for instance at least generally in accordance with mounting legs 230—FIG. 9) that extend between the crankcase housing 420 and a mounting ring (not shown, but for instance at least generally in accordance with mounting ring 260—FIG. 9). Each mounting leg 422 includes an upper section 424 (for instance at least generally in accordance with upper section 240—FIG. 9) that may be integrally formed with the crankcase housing 420, as well as a lower section 426 (for instance at least generally in accordance with lower section 250—FIG. 9).

The engine assembly 400 of FIGS. 11a and 11b may be mounted to an airframe of an aircraft or aerial vehicle (for instance at least generally in accordance with the discussion of FIG. 9). In this case, the engine assembly 400 includes a propeller assembly 428 having a propeller 404. Operation of the engine 430 rotates a crankshaft within the crankcase housing 420, which in turn rotates the propeller assembly 428 (and its propeller 404) about a rotational axis 440. The engine assembly 400 could utilize the exhaust system reflector 380 used by the engine 310 of FIGS. 10*a* and 10*b*.

The invention has been described in an illustrative manner and it is to be understood that the terminology which has been used is intended to be in the nature of words of description rather than of limitation. Alternative modifications and variations of the present invention are possible during the continued development of the current desired engine configuration and alternative applications. It is to be understood that it is within the scope of the invention that the invention may be applied otherwise than as specifically described. The following claims are also in accordance with the invention.

What is claimed is:

1. A vehicle comprising a vehicle body and an engine module,
   said engine module comprising:
   a heat source;
   a heat exchanger associated with said heat source;
   a cooling shroud body, wherein said cooling shroud body defines a cooling medium flowpath therein, said cooling medium flowpath extending from an inlet of said cooling shroud body to an outlet of said cooling shroud body in a dimension that coincides with a direction of travel of said vehicle when said engine module is in operation, such that a flow of a cooling medium through said cooling medium flowpath removes heat from said heat exchanger, and wherein said cooling shroud body comprises:
   a first movable door disposed at said inlet and a second movable door disposed at said outlet, such that said first movable door and said second movable door are also spaced from one another in said dimension that coincides with said direction of travel of said vehicle when said engine module is in operation, wherein said heat exchanger is located between said first movable door and said second movable door, and wherein said first movable door is pivotable about a first axis and said second movable door is pivotable about a second axis;
   a bell crank that is pivotable about a third axis;
   a first control linkage that operatively interconnects said first movable door with said bell crank at a first location that is spaced from said third axis;
   a second control linkage that operatively interconnects said second movable door with said bell crank at a second location that is spaced from both said third axis and said first location;
   a drive source; and
   a drive linkage that operatively interconnects said drive source with said bell crank at a third location that is spaced from each of said third axis, said first location, and said second location, wherein an operation of said drive source will simultaneously adjust a position of both said first movable door and said second movable door via each of said first control linkage, said second control linkage, and said drive linkage.

2. The vehicle of claim 1, wherein said engine module further comprises:
   a controller operatively interconnected with said drive source, wherein said controller is configured to control said adjustment of said position of both said first movable door and said second movable door via said drive source.

3. The vehicle of claim 1, wherein said drive source comprises first and second motors that are operatively interconnected with said first and second movable doors, respectively.

4. The vehicle of claim 1, wherein said drive source comprises a single motor that is operatively interconnected with each of said first and second movable doors.

5. The vehicle of claim 1, wherein said drive source is operable to simultaneously adjust said first and second movable doors by a common amount in a flow-increasing direction relative to said cooling medium flowpath, and wherein said drive source is operable to simultaneously adjust said first and second movable doors by a common amount in a flow-decreasing direction relative to said cooling medium flowpath.

6. The vehicle of claim 1, wherein said heat source is selected from the group consisting of an engine block, a cylinder head, and a cylinder head mounted to an engine block.

7. The vehicle of claim 1, wherein said heat exchanger is mounted to or incorporated by said heat source.

8. The vehicle of claim 1, wherein said engine module comprises an internal combustion engine.

9. The vehicle of claim 1, wherein said heat exchanger comprises a plurality of cooling fins that are disposed within said cooling medium flowpath.

10. The vehicle of claim 1, wherein said heat source comprises said heat exchanger such that said cooling medium flowpath extends through said heat source, wherein said engine module further comprises an inlet header and an outlet header, such that said first movable door is associated with said inlet header, and said second movable door is associated with said outlet header.

11. The vehicle of claim 1, wherein said engine module further comprises:
    a controller operatively interconnected with said drive source; and
    a temperature sensor associated with said heat source and operatively interconnected with said controller.

12. The vehicle of claim 1, wherein said vehicle is selected from the group consisting of an aircraft and a watercraft.

13. The vehicle of claim 1, wherein said drive source is operable such that said drive linkage exerts a pushing force on said bell crank to simultaneously pivot each of said first and second movable doors through said first and second control linkages, respectively, and in a flow-increasing direction, and wherein said drive source is operable such that said drive linkage exerts a pulling force on said bell crank to simultaneously pivot each of said first and second movable doors through said first and second control linkages, respectively, and in a flow-decreasing direction.

14. A vehicle comprising a vehicle body and an engine module, said engine module comprising:
    an engine;
    a cooling shroud body mounted on said engine, wherein said cooling shroud body defines an interior flowpath therein, said interior flowpath extending from an inlet of said cooling shroud body to an outlet of said cooling shroud body, such that a flow of a cooling medium through said interior flowpath removes heat generated by said engine, and wherein said cooling shroud body comprises:
    an inlet door at said inlet that is pivotable about a first axis;
    an outlet door at said outlet that is pivotable about a second axis;
    a bell crank that is pivotable about a third axis;
    a first control linkage that operatively interconnects said inlet door with said bell crank at a first location that is spaced from said third axis;

a second control linkage that operatively interconnects said outlet door with said bell crank at a second location that is spaced from both said third axis and said first location;

a drive source; and a drive linkage that operatively interconnects said drive source with said bell crank at a third location that is spaced from each of said third axis, said first location, and said second location, wherein an operation of said drive source will simultaneously adjust a position of both said inlet door and said outlet door via each of said first control linkage, said second control linkage, and said drive linkage.

15. The vehicle of claim 14, wherein said drive source comprises a single motor.

16. The vehicle of claim 15, wherein a first operational mode of said motor simultaneously adjusts said inlet door and said outlet door in a flow-increasing direction relative to said interior flowpath and a second operational mode of said motor simultaneously adjusts said inlet door and said outlet door in a flow-decreasing direction relative to said interior flowpath.

17. The vehicle of claim 14, wherein said drive source is operable such that said drive linkage exerts a pushing force on said bell crank to simultaneously pivot each of said inlet door and said outlet door in a flow-increasing direction through said first and second control linkages, respectively, and relative to said interior flowpath, and wherein said drive source is operable such that said drive linkage exerts a pulling force on said bell crank to simultaneously pivot each of said inlet door and said outlet door in a flow-decreasing direction through said first and second control linkages, respectively, and relative to said interior flowpath.

18. The vehicle of claim 14, wherein said engine module further comprises:

a controller operatively interconnected with said drive source, wherein said controller is configured to control said adjustment of said position of both said inlet door and said outlet door via said drive source.

19. The vehicle of claim 14, wherein said drive source comprises first and second motors that are operatively interconnected with said inlet door and said outlet door, respectively.

20. The vehicle of claim 14, wherein said engine comprises a heat exchanger.

21. The vehicle of claim 20, wherein said heat exchanger comprises a plurality of cooling fins that are disposed within said cooling medium flowpath.

22. The vehicle of claim 20, wherein said engine comprising said heat exchanger is configured such that said cooling medium flowpath extends through said engine, wherein said engine module further comprises an inlet header and an outlet header, such that said inlet door is associated with said inlet header, and said outlet door is associated with said outlet header.

23. The vehicle of claim 14, wherein said engine is an internal combustion engine.

24. The vehicle of claim 14, wherein said engine module further comprises:

a controller operatively interconnected with said drive source; and a temperature sensor associated with said engine and operatively interconnected with said controller.

25. The vehicle of claim 14, wherein said vehicle is selected from the group consisting of an aircraft and a watercraft.

\* \* \* \* \*